United States Patent [19]

Hechel et al.

[11] Patent Number: 5,018,853
[45] Date of Patent: May 28, 1991

[54] ANGLE SENSOR WITH CCD

[75] Inventors: Dennis L. Hechel, New Berlin; Raymond H. Niemetschek, Brookfield; Tobin Slocum, Waukesha; Gary R. Kercheck, Colgate; Michael C. Crawford, Milwaukee, all of Wis.

[73] Assignee: Bear Automotive Service Equipment Company, New Berlin, Wis.

[21] Appl. No.: 533,133

[22] Filed: Jun. 4, 1990

[51] Int. Cl.$^5$ ............................................ G01B 11/275
[52] U.S. Cl. ..................................... 356/155; 33/288; 356/152
[58] Field of Search ................... 356/152, 155; 33/288

[56] References Cited

U.S. PATENT DOCUMENTS

| 3,865,492 | 2/1975 | Butler | 356/155 |
|---|---|---|---|
| 3,901,604 | 8/1975 | Butler | 356/152 |
| 4,319,838 | 3/1982 | Grossman et al. | 356/152 |
| 4,594,789 | 6/1986 | Marino et al. | 33/288 |
| 4,854,702 | 8/1989 | Stieff | 356/155 |
| 4,898,464 | 2/1990 | Thorne et al. | 356/152 |

Primary Examiner—F. L. Evans
Attorney, Agent, or Firm—Kinney & Lange

[57] ABSTRACT

An automotive vehicle wheel alignment system uses a light source and a linear CCD to measure angles. A mask having a slit through which light from the light source is projected onto the surface of the linear CCD is interposed between the light source and the linear CCD. A microprocessor controls the light source and the linear CCD and uses an output from the linear CCD to calculate an angle between the light source and the linear CCD. The microprocessor uses a search algorithm to locate the center of the image projected on the linear CCD. Calibration data for the linear CCD is stored in an EEPROM.

28 Claims, 7 Drawing Sheets

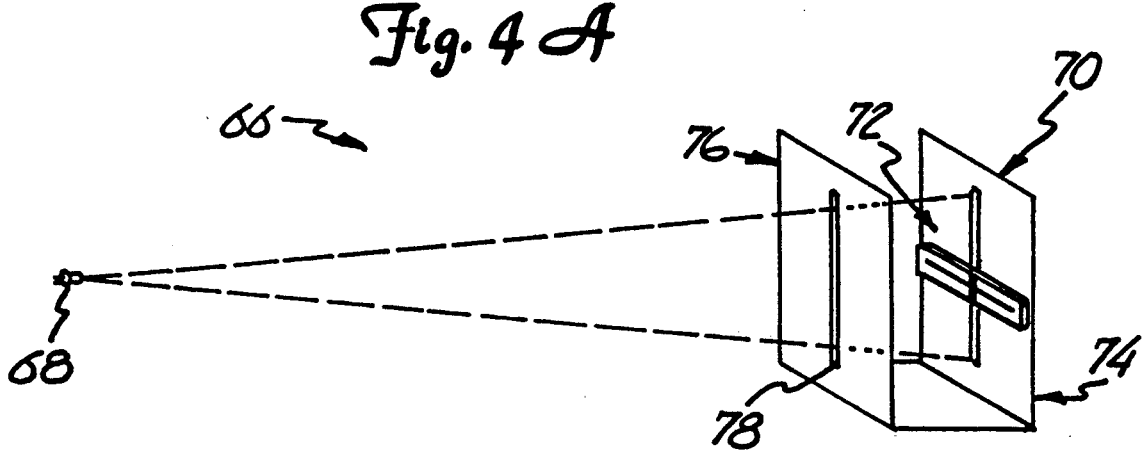
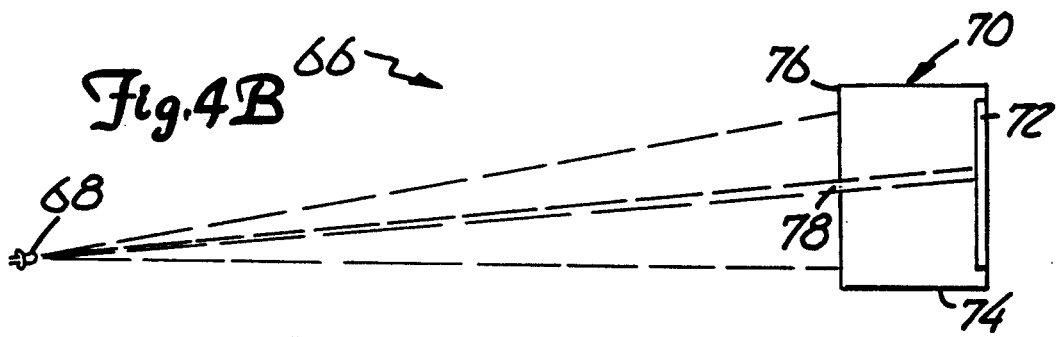
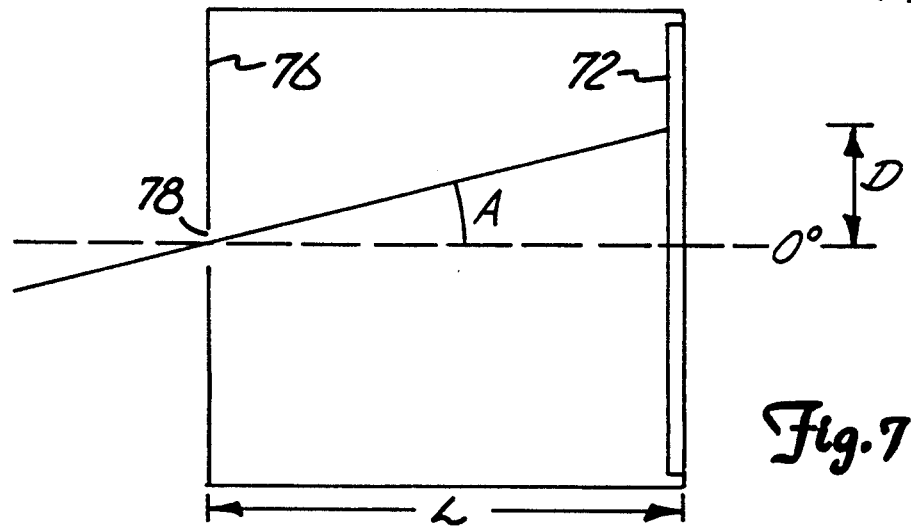
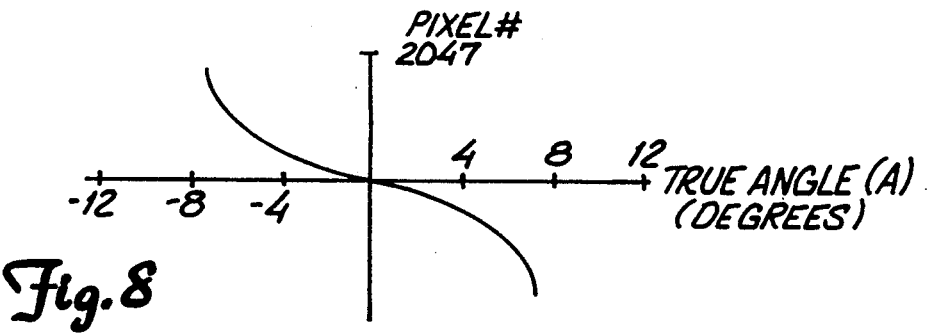

ANGLE SENSOR WITH CCD

BACKGROUND OF THE INVENTION

The present invention relates to automobile wheel alignment systems. In particular, the invention relates to an angle sensor in an automobile wheel alignment system which uses a charge coupled device (CCD).

Proper alignment of wheels in an automotive vehicle is important for proper handling of the vehicle and proper tire wear. In addition, the proper alignment of the wheels will decrease fuel consumption as well as increase vehicle safety. The wheel alignment parameters which are measured and adjusted in order to achieve proper wheel alignment are camber, caster, steering axis inclination and toe.

The static toe angle of a wheel, at a specified wheel load or relative position of the wheel center with respect to a sprung mass, is the angle between a longitudinal axis and a line of intersection of wheel plane and road surface. The wheel is "toed-in" if the forward portion of the wheel is turned toward a central longitudinal axis of the vehicle, and "toed-out" if turned away. Accurate toe adjustment cannot be attained without properly calibrated measuring instruments.

Camber is defined as the angle which the wheel makes with respect to a vertical plane when looking at the wheel from either the front or the rear of the automobile. Any wheel of an automobile can have camber.

Caster is an angle which the steering axis of a steerable wheel (typically one of the front wheels) makes with respect to the vertical plane which is perpendicular to the longitudinal direction of the perpendicular to the longitudinal direction of the automobile.

Steering axis inclination (SAI) is the inclination of the steering axis with respect to a vertical plane which is parallel to the longitudinal direction of the automobile Toe was originally defined as the difference of the distance between the front edges of two opposite wheels and the distance between the rear edges of the same two wheels. Toe can also be defined in terms of an angular relationship of the plane of a wheel (perpendicular to its turning axis) relative to a predetermined longitudinal vehicle axis. When the forwardmost portions of a pair of adjacent wheels are closer together than the rear portions of those wheels, they are commonly referred to as in a "toe-in" condition. When the rear portions of wheels are closer together than the front portions, the condition is commonly referred to as "toe-out."

Camber is a tire wearing angle and also affects handling of the automobile. Caster and SAI do not affect tire wear, but are important for directional control. Toe is a tire wearing angle and also affects the position of the steering wheel required in order to maintain the automobile along a straight line Camber, caster and SAI are typically measured using one or more inclinometers which are attached to the wheel. With camber, the inclinometer measures the angle that the spindle makes with horizontal. With caster, the wheel is turned through an arc, and the difference in the camber readings is used to derive the caster value. SAI is measured in a manner similar to caster, except that the inclinometer used for the SAI reading is aligned at 90 degrees to the inclinometer used for reading camber and caster.

There is a continuing need for improved angle measurement systems which are easy to build and set up, and lower in cost.

SUMMARY OF THE INVENTION

The present invention provides a wheel alignment system for measuring the angular relationship between the four wheels of an automotive vehicle. Angle measurements are taken using four head units which are attached to the wheels of the vehicle. Each head unit includes a linear CCD which produces a CCD output signal representative of a field of view. The head unit also includes a light radiation source which is directed to a CCD on another head unit. A slit is formed in a mask which is interposed between the radiation source and the CCD. Each mask is attached to a head unit in front of the CCD. The mask allows only a narrow line of radiation to fall on the linear CCD. The linear CCD and the slit are positioned so that an angle between the CCD and the line of radiation is generally 90 degrees. If the radiation source and the linear CCD are moved relative to each other, the position of the line of radiation moves along the linear CCD.

The apparatus includes a controller for operating the linear CCD and the radiation sources and for analyzing the output of the head units from the linear CCDs to derive an angular relationship of the wheels in an automotive vehicle Noise is limited in the measurements using a noise substraction technique. Calibration data is stored in an EEPROM on each of the head units.

BRIEF DESCRIPTION OF THE DRAWINGS

FIG. 4A is a perspective view of an angle sensor in the alignment apparatus of FIG. 1.

FIG. 4B is a plan view of the angle sensor of FIG. 4A.

FIG. 7 is a diagram which shows the angle of light in entering the angle sensor of FIG. 4A and 4B.

FIG. 8 is a graph of pixel number versus true angle.

DETAILED DESCRIPTION OF THE PREFERRED EMBODIMENTS

Figure 1:
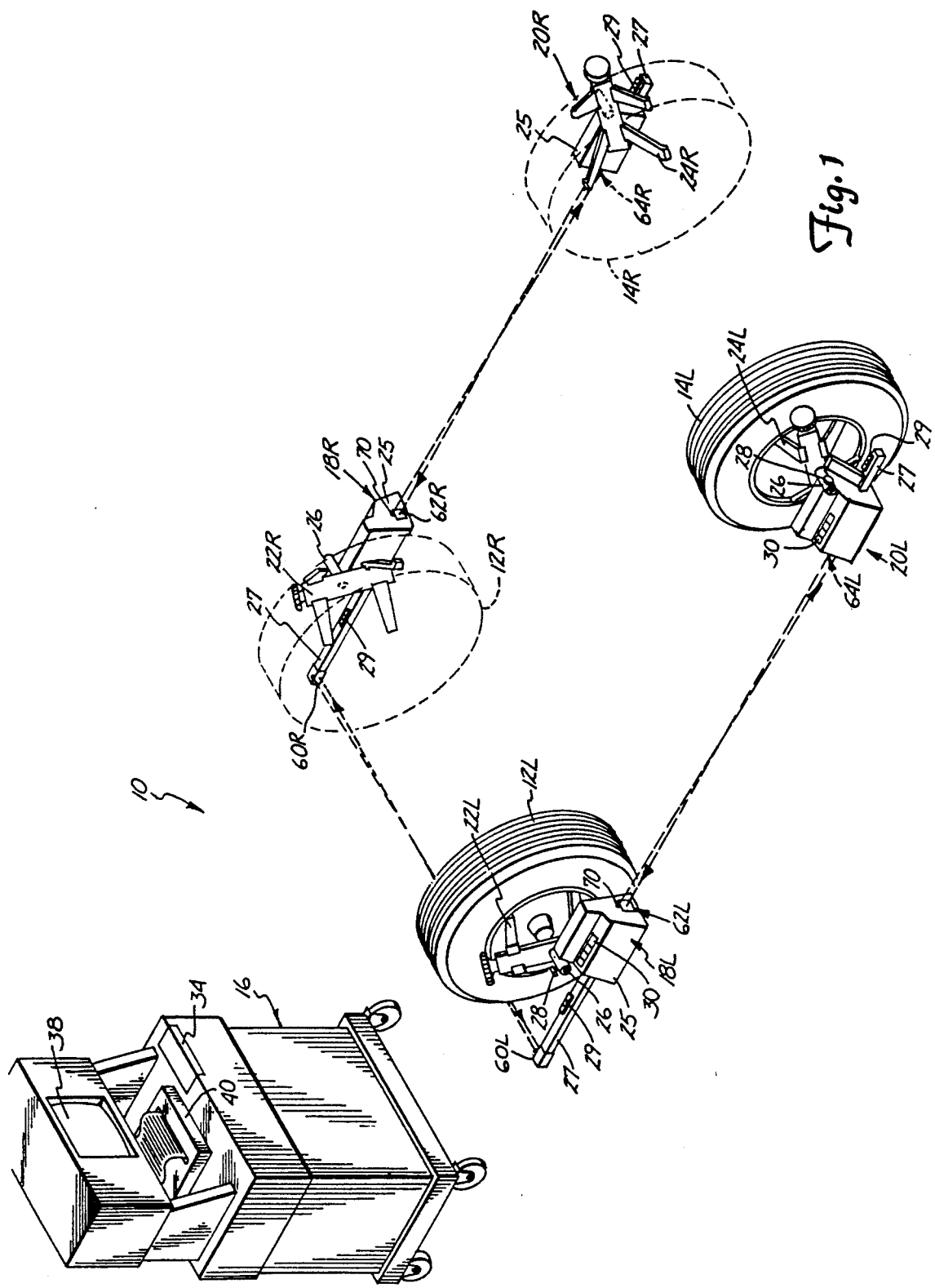
FIG. 1 is a perspective view of the alignment apparatus of the present invention.
Figure 2A:
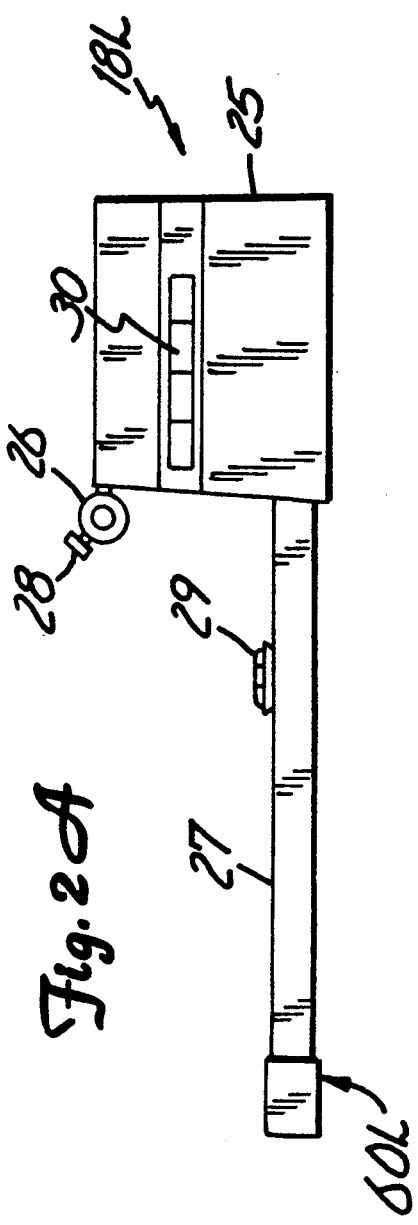
FIGS. 2A, 2B and 2C are left side, right side and right rear elevational views, respectively, of the left front head unit of the apparatus of FIG. 1.
Figure 2C:
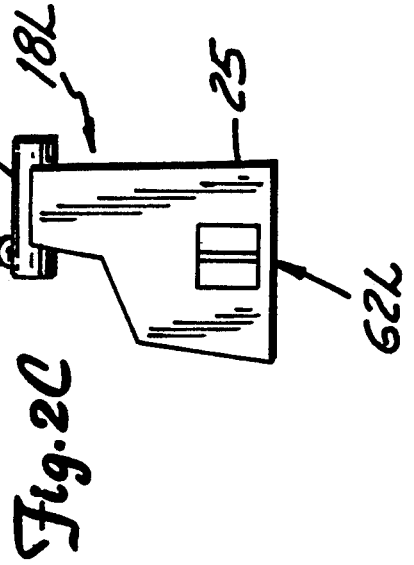
Figure 2B:
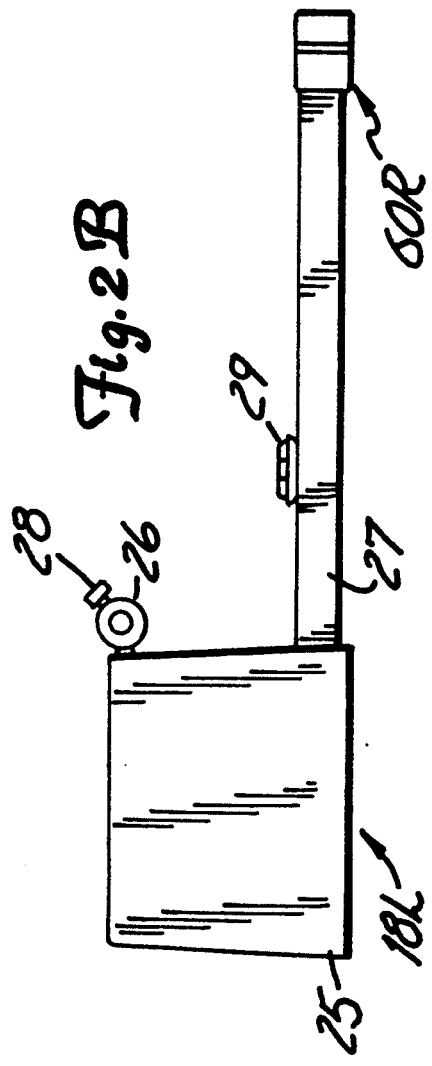

In FIG. 1, wheel alignment system 10 of the present invention is used to measure the alignment of left front wheel 12L, right front wheel 12R (shown in phantom), left rear wheel 14L and right rear wheel 14R (shown in phantom) of an automotive vehicle. For clarity, the remaining portions of the vehicle are not shown. System 10 includes a main console 16, left and right front head units 18L and 18R, and left and right rear head units 20L and 20R. Head units 18L, 18R, 20L and 20R are connected to main console 16 by cables (not shown). FIGS. 2A–2C show head unit 18L in further detail.

Head units 18L, 18R, 20L and 20R are supported on wheels 12L, 12R, 14L and 14R by rim clamps 22L, 22R, 24L and 24R, respectively. Rim clamps 22L, 22R, 24L and 24R are self-centering, four-leg rim clamps which fit a wide range of different wheel sizes without the need for special adapters Each head unit (18L, 18R, 20L, 20R) includes a housing 25, a sleeve 26 and an arm 27. Sleeve 26 mounts over a spindle of the corresponding rim clamp. Each head unit (18L, 18R, 20L, 20R) is locked into position on the spindle of the corresponding rim clamp (22L, 22R, 24L, 24R) by spindle clamp 28. A bubble level 29 mounted on arm 27 provides a visual indication to the mechanic that the head unit (18L, 18R, 20L, 20R) is level horizontally before spindle clamp 28 is clamped. A set of switches 30 on housing 25 allows the mechanic to signal main console 16 that a measurement is made and to respond to messages displayed by main console 16.

Figure 3:
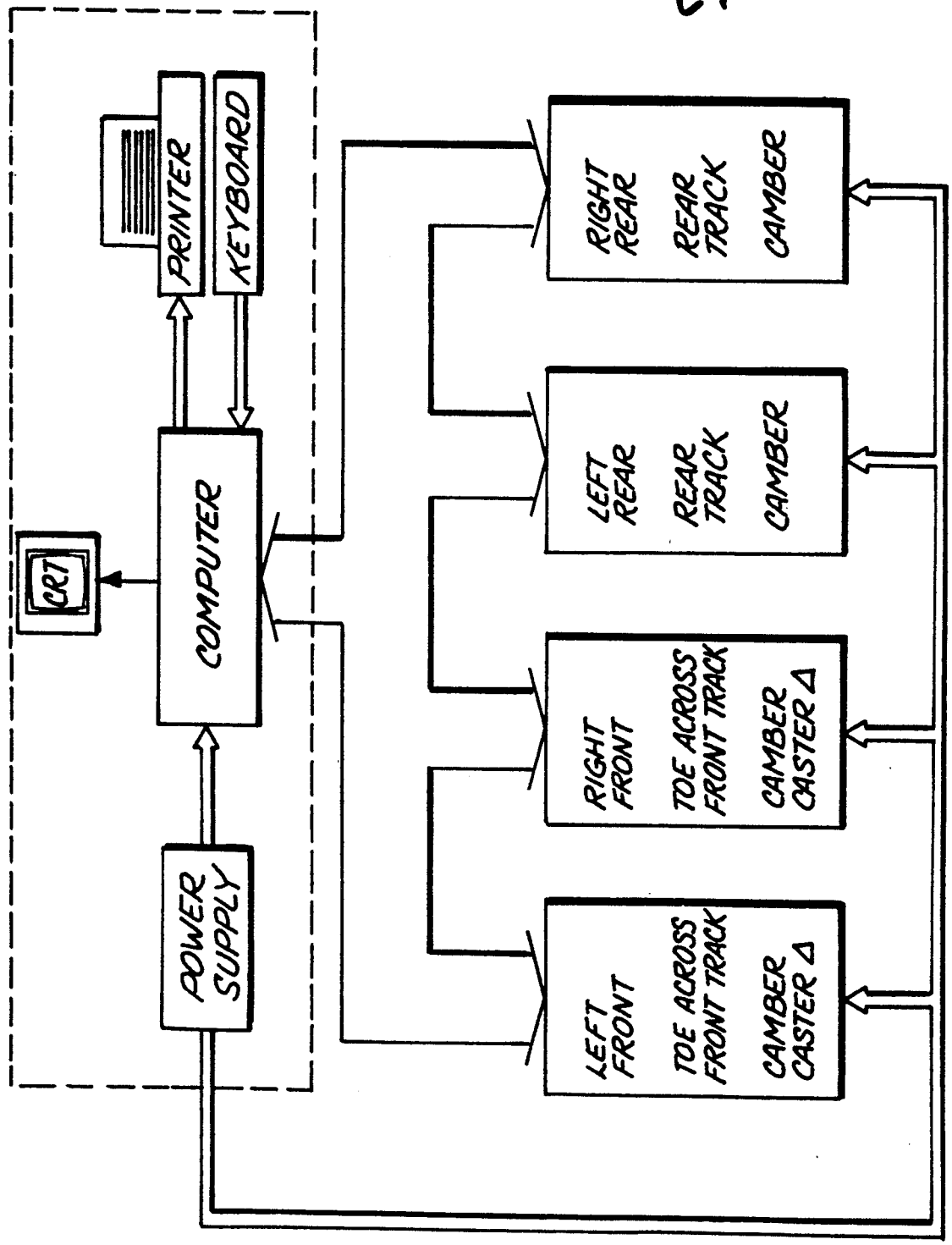
FIG. 3 is an electrical block diagram of the apparatus in FIG. 1.

As shown in FIG. 3, main console 16 includes computer 32, which has keyboard 34 as an input device and has CRT display 38 and printer 40 as output devices Power supply 42, which is located within main console 16, supplies power to computer 32 and its input and output devices, and also supplies power to head units 18L, 18R, 20L and 20R.

Computer 32 supplies data and instructions to the head units 18L, 18R, 20L and 20R and receives wheel alignment measurement values from each of the head units. Based upon these measurement values, computer 32 provides wheel alignment output values and other information to an operator through CRT display 38 and printer 40.

Communication between computer 32 and head units 18L, 18R, 20L and 20R is accomplished through a data bus 46 shown in FIG. 3. Data bus 46 connects an input to computer 32 to the head units 18L, 18R, 20L and 20R. Data bus 48 connects an output of computer 32 with inputs of head units 18L, 18R, 20L and 20R.

In wheel alignment system 10 shown of Fig. I, there are a total of six angle sensor units used to measure toe angles. Front left head unit 18L carries a left-to-right sensor 60L and a front-to-rear sensor 62R. Left rear head unit 20R carries a rear-to-front angle sensor 64R.

The angle sensor units are arranged to operate in pairs. Sensors 60L and 60R are mounted at the front ends of arms 27 of front head units 18L and 18R and face one another. Sensor 62L is mounted at the rear end of housing 25 of head unit 18L and faces sensor 64L which is mounted at the front end of head unit 20L. Similarly, sensor 62R of head unit 18R faces sensor 64R of head unit 20R.

FIGS. 4A and 4B are perspective and top views, respectively, illustrating a linear CCD angle detector 66 in accordance with the present invention. Sensor 66 comprises light source 68 and optical bench 70. Radiation source 68 is coupled to one head unit, 18L for example, and optical bench 70 is mounted to another head unit, 18R for example. In this configuration, angle sensor 66 measures cross-toe angle.

Optical bench 70 includes linear CCD 72 and frame 74. Frame 74 includes a mask 76. Mask 76 defines a slit 78. Slit 78 may comprise a cylindrical lens. A filter (not shown) may be placed in front of CCD 72 to reduce interference from stray light sources. Slit 78 is at a right angle to linear CCD 72. Slit 78 allows a portion of the light from light source 68 to fall upon linear CCD 72. The remaining portion of the light from light source 68 directed at linear CCD 72 is blocked by mask 72. A suitable linear CCD 72 is TCD 102D available through Toshiba, 7300 Metro Boulevard, Edina, MN 55435.

FIG. 4A shows the relationship between light source 68 and optical bench 70 at an angle of 0 degrees. FIG. 4B shows the relationship of light source 68 and optical bench 70 when light source 68 is not in alignment with optical bench 70.

Figure 5:
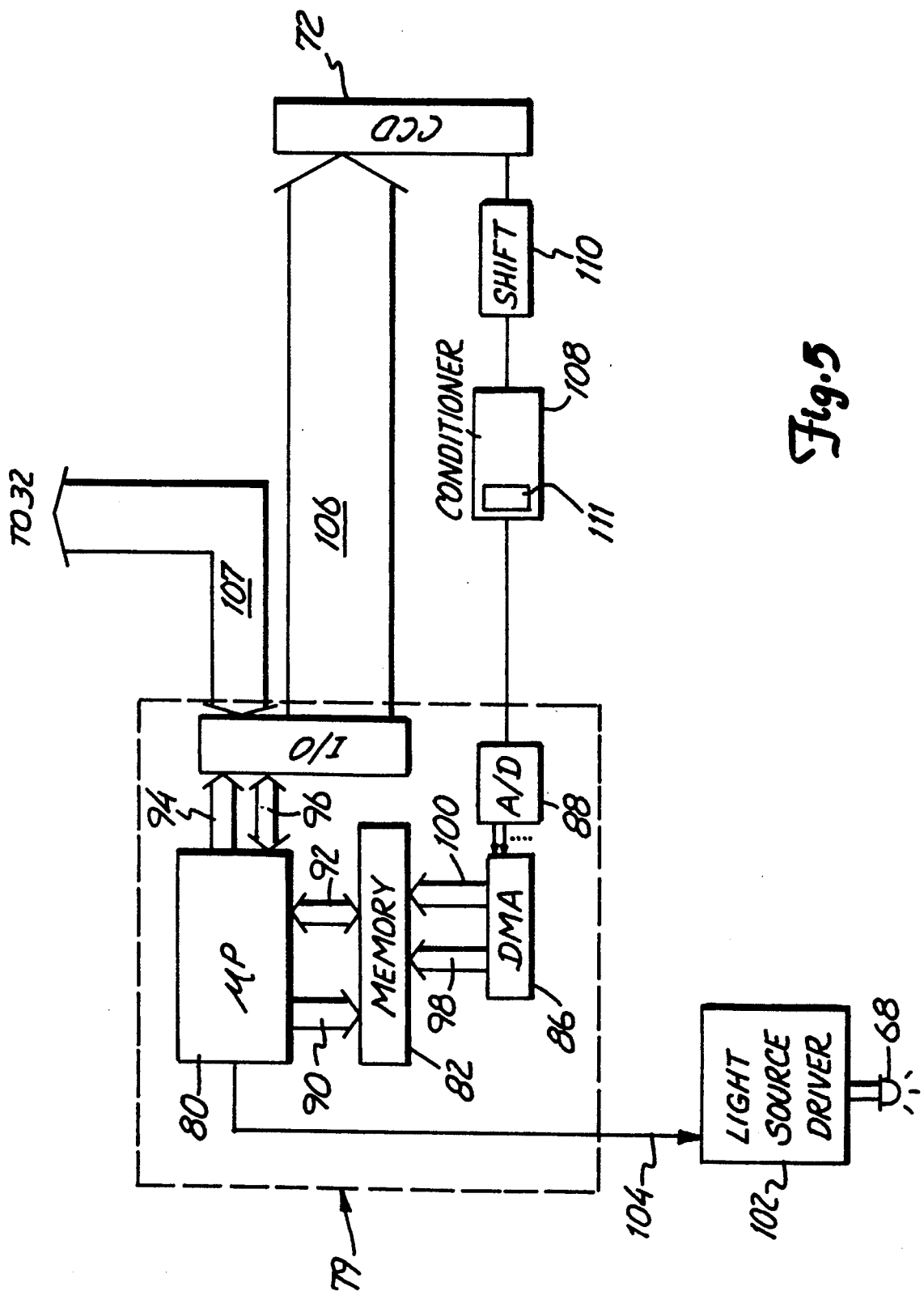
FIG. 5 is an electrical block diagram of the angle sensor and control circuitry of the present invention.

FIG. 5 is a block diagram which shows how a controller 79 controls light source 68 and linear CCD 72. Controller 79 includes microprocessor 80, memory 82, input-output circuitry 84, direct memory access circuit 86 and analog-to-digital converter 88. For simplicity, only a single controller 79 is shown, however, wheel alignment system 10 includes a total of four controllers 79. Six angle sensors are used for left and right cross-toe, front-to-back and back-to-front left track and front-to-back and back-to-front right track angle measurements.

Microprocessor 80 is connected to memory 82 through address bus 90 and data bus 92. Data bus 92 transfers data in both directions between microprocessor 80 and memory 82 Microprocessor 80 connects to input-output circuitry 84 through address bus 94 and data bus 96. Direct memory access circuit 86 connects to memory 82 through address bus 98 and data bus 100.

Microprocessor 80 is connected to light source 68 through a light source driver 102. A control line 104 connects light source driver 102 to microprocessor 80. Linear CCD 72 is connected to input-output circuitry 84 through control bus 106. Linear CCD 72 connects to analog-to-digital converter 88 through signal conditioner 108.

Controller 79 is linked to computer 32 through data bus 107. Data bus 107 carries instructions and synchronization data to controller 79. Data bus 107 also carries information from controller 79 to computer 32. Computer 32 synchronizes each controller 79 associated with each head unit. Synchronization of each controller 79 occurs at regular intervals between 6 to 12 seconds. During the interim between synchronization from computer 32, controller 79 keeps time using an internal crystal-based oscillator (not shown). Timing is reset using the synchronization data from computer 32.

Address bus 90 is used to address memory 82. Data bus 92 carries data to and from memory 82 and microprocessor 80. Address bus 94 is used to address input-output circuitry 84. Address bus 98 is used by direct memory access circuit 86 to address memory circuit 82 and data bus 100 is used to transfer digital information from direct memory access circuit 86 to memory circuit 82. Analog-to-digital converter 88 receives an analog signal from signal conditioner 108 and provides a digital output to direct memory access circuit 86. Input-output circuit 84 sends control data to linear CCD 72 through control bus 106. Light source driver 102 provides a drive signal to light source 68 based upon control signals from microprocessor 80 received through control line 104.

OVERVIEW

Typically, six angle sensors 66 in the horizontal plane are used to measure the alignment of the wheels of an automotive vehicle. Angle sensor 66 can use infrared or visible light sensors and sources. A multi-element linear CCD 72 is used to sense light from light source 68. Linear CCD 72 comprises a row of 2048 pixels. Slit 78 and mask 76 allow only a portion of the 2,048 pixels to be illuminated by light source 68. Typically, the image will illuminate about 20 to 22 pixel elements of linear CCD 72. However, the width of the image projected on linear CCD 72 may range from about 2 pixel elements to about 80 pixel elements.

As optical bench 70 is rotated and the angle between optical bench 70 and light source 68 is changed, the line of light produced by slit 78 moves across the pixels of linear CCD 72. At zero degrees, pixel elements near the center of linear CCD 72 are illuminated. As the bench is rotated, elements farther from the center of the sensor are illuminated. The angle of rotation is found by determining which of the pixel elements of linear CCD 72 are illuminated and calculating how far the angle is from zero degrees For small angles, the angle measured is approximately proportional to the distance the illuminated pixel elements are from those pixel elements which are lighted at zero degrees (the actual relationship includes an arctangent function).

Typically, the distance between slits 78 and linear CCD 72 is about 2⅜ inches. This distance determines the measurement range of the sensor and also the resolution. At about 2⅜ inches, the range is about plus or minus 12 degrees and the resolution is about 0.012 degrees. If this distance is doubled to 5¼ inches, the range would be about plus or minus 6 degrees and the resolution would be about 0.006 degrees. Alternatively, if the distance were halved to about 15/16 inch, the range would be about plus or minus 24 degrees and the resolution about 0.024 degrees. Sensors with wide ranges are useful for turning angle (toe out on turn) measurements. Sensors with narrow ranges and high resolutions are useful for accurate toe measurements when electronic turn plates are used for castor swing measurements. For these reasons, the distance between slit 78 and linear CCD 72 of between about one half inch to about 8 inches may be useful in wheel alignment systems, in accordance with the present invention.

Slit length determines the range of the allowed tilt of the sensor in an access perpendicular to the access of measurement (allowed camber angle) while measuring toe or allowed pitch angle while measuring toe with track sensors. A range of plus or minus 12 degrees is obtained by making the length of slit 78 about equal to the length of linear CCD 72. This should be sufficient for most alignment needs. If the distance between slit 78 and linear CCD 72 is changed from 2⅜ inches, the length of slit 78 should also be changed to maintain a range of plus or minus 12 degrees. For example, if the distance between slit 78 and linear CCD 72 is doubled, the length of slit 78 must also be doubled.

Microprocessor 80 controls linear CCD 72. Analog-to-digital converter 88 converts an analog output signal from linear CCD 72 into a digital signal In one embodiment, analog-to-digital converter 88 comprises a flash analog-to-digital converter.

Light source 68 is turned on and off periodically by microprocessor 80. The output of linear CCD 72 is read when light source 68 is off and again when light source 68 has been turned on. The output from linear CCD 72 is monitored by microprocessor 80 and the exposure time is controlled by microprocessor 80 to give maximum signal output but avoid saturation of the pixel elements in linear CCD 72. The difference between the output of linear CCD 72 when light source 68 is on and when light source 68 is off is calculated and stored. This difference in readings is due to ambient light falling on the pixels of linear CCD 72. This calculation eliminates inputs to CCD 72 from extraneous background and internal dark currents, bias and drift which affect the output of linear CCD 72. The result is a profile stored in memory 82 which shows the effect of light source 68 alone on each pixel element of linear CCD 72. An algorithm is employed to locate the image of the slit which falls on linear CCD 72 due to light source 68 and the angular relationship between light source 68 and optical bench 70 is calculated.

CCD CONTROL

The purpose of linear CCD 72 is to convert light energy from light source 68 into electrical energy and provide an output representing an image. Linear CCD 72 uses a linear array of about 2,048 photo-sensitive cells (pixels) which collect light for a controlled period of time (the exposure time), and provide a serial output of data from the pixels This output is essentially a "snapshot" or "picture" of the scene to which linear CCD 72 was exposed. This happens in a two-step process: exposure time followed by transfer and serial shift-out.

When the 2,048 pixels are exposed to light, they individually accumulate an amount of photons which they convert into electrical charges in direct proportion to the intensity of the incoming light and the total time for which that pixel is exposed. When the exposure is terminated (by microprocessor 80), the 2,048 accumulated charges are transferred from the photo-sensitive cells to an analog shift register having 2,048 discrete locations.

Following the transfer process, the photosensitive pixels again begin to collect light energy for the next exposure. The time between these transfers constitutes the effective exposure time of the linear CCD 72.

The cells of shift register 110 sequentially carry the individual charges, one at a time, and convert them to an output voltage signal. This analog voltage output signal is conditioned by signal conditioner 108 before being applied to flash analog-to-digital converter 88 and stored into memory 82 by dynamic memory access circuit 86.

Figure 6:
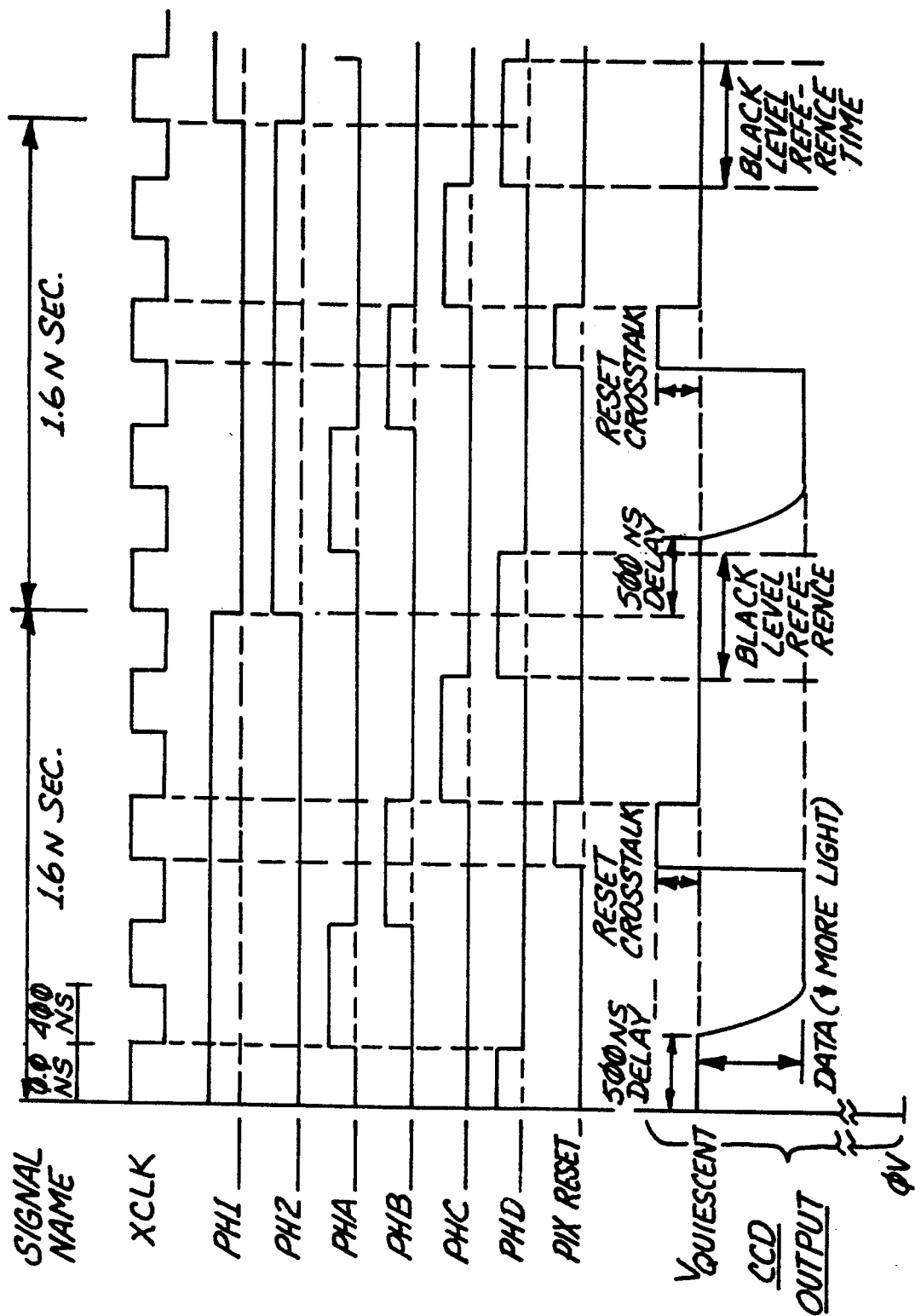
FIG. 6 is a timing diagram of signals in the present invention.

Control bus 106 carries a number of different control lines which are used to control linear CCD 72. Control bus 106 carries signals Phase 1 (PH1), Phase 2 (PH2), transfer clock (XCLK), pixelreset (PIXRESET), Phase A, (PHA), Phase B (PHB), Phase C (PHC) and Phase D (PHD), as shown in FIG. 6.

Microprocessor 80 generates the signals in the proper timing and synchronization sequences. PHI and PH2 are two square waves which are 180 degrees out of phase. They are used as the general clocking and synchronization inputs to all of the linear CCDs 72 in alignment system 10. All of the linear CCDs 72 and all data from the CCDs 72 are timed and referenced to these signals.

When the collected charges in linear CCD 72 are to be transferred to analog shift register 110 and a particular exposure terminated, a highgoing pulse is applied to linear CCD 72 by the XCLK control line. The timing of the pulses on the XCLK control line is determined by a microprocessor 80.

The output of shift register !10 is a series of voltages, each of which represents a pixel element of linear CCD 72. Each pixel is output at a rate of two times the rate of PH1 and PH2. Specifically, the pixels are clocked out at each positive and negative edge in the signal of PH1 and PH2. The PIXRESET control signal is used to empty any charge stored in linear CCD 72. The PIXRESET pulse is applied to linear CCD 72 after analog-to-digital conversion to the previous pixel, but prior to the pulse on PH1 and PH2 which advances a new pixel to the output of CCD 72.

BLACK LEVEL REFERENCING

The output of linear CCD 72 rides on a nominal DC level of 4.5 Volts to 8 Volts. This varies between devices and with temperature. It is necessary to strip this DC bias before applying gain or analog-to-digital conversion to the signal Another offset is the portion of the output signal, as shown in FIG. 6, that goes positive from the operating point These positive going pulses are due to internal cross talk from the reset activity in CCD 72. As with the DC bias level, the only definite property of this cross talk is that it varies in amplitude between CCDs.

Furthermore, the actual analog data increases in the negative direction with increasing light. Inverting the data before the analog-to-digital converter would make increasing light directly related to increasing digital values output by the analog-to- e digital converter.

Black level referencing is designed to provide AC coupling. Black level referencing takes advantage of the fact that during the time after the expiration of the PIXRESET pulse but prior to the arrival of the new pixel data (the next edge of the PHI or PH2 control signal), there is a plateau on the CCD output signal whose voltage is the same as for a totally unilluminated CCD, i.e. a black level. During this time, one of the shorter phases, PHD, is used to turn on analog gates that force a coupling capacitor (not shown) to become charged to the output voltage.

Black level adjustment is done on every pixel, and therefore the coupling capacitor can be relatively small which allows accurate transfer of pixel data while maintaining a very steady DC offset.

CALIBRATION

FIG. 7 is a diagram of linear CCD 72 and mask 76 and shows angle and distant relationships. L is the distance between mask 76 and linear CCD 72, A is the angle of the light from light source 68 and D is the distance from the illuminated pixels to the center pixel of CCD 72. The output of linear CCD 72 is directly proportional to the distance D defined by the relationship D=L x Tangent (A). Where A is the angle between light source 68 and optical bench 70.

FIG. 8 is a graph of pixel number output versus true angle. Pixel number output, or "pixel count" is the value or address of the one pixel closest to the center of the image projected onto linear CCD 72 through slit 78 from light source 68. The curve of FIG. 8 is exaggerated. To measure angles with linear CCD 72, the systems must be calibrated. A first reading is taken at zero degrees and a second reading is taken at an angle of four degrees. The difference between these two readings is called the gain. The reading at zero degrees is called the zero.

The relationship between CCD count (i.e. which pixel(s) is illuminated by source 68) and various angles is an arctangent relationship.

A tangent constant, K, is derived for each CCD sensor using the 4 degree gain value as follows:

tangent (4 deg.)=K * gain
K=tangent (4 deg.)/gain

The angle calculated for a given CCD count is then derived as follows:

Angle=arctangent ((CCD count−zero) * K)

Theoretically, the error at any angle is 0 when using the arctangent function on the CCD count.

An EEPROM 11 is included in signal conditioner 108 in which calibration data for linear CCD is stored. Each EEPROM is a 1,024 bit serial EEPROM. Calibration data for each linear CCD 72 is stored in EEPROM 111.

NOISE ELIMINATION TECHNIQUE

In order for angle sensor 66 to provide accurate readings, the exposure of linear CCD 72 must be controlled. The light intensity which illuminates linear CCD 72 must not be allowed to overload or saturate the photo sensitive pixel cells of CCD 72. The exposure time is shortened to reduce the total accumulated charge and thereby prevent saturation. However, there are practical limits to how short the exposure time can be cut. If saturation still occurs using the shortest exposure time, the incoming light must also be reduced.

When light source 68 and linear CCD 72 are in close proximity, the light from source 68 is reduced by turning it on and off for a period of time shorter than the shortest possible exposure time. This is effective in avoiding saturation because the accumulated charge is a function of the light intensity times the exposure time.

Second, if saturation is avoided, it is desirable to have as much signal as possible, but not more signal than analog-to-digital converter 88 can handle. To achieve this, microprocessor 80 lengthens the exposure time for increased signal strength from linear CCD 72. A comparator (not shown) is used to detect if the signal approaches the threshold limit of analog-to-digital converter 88. If the threshold of the comparator is exceeded, microprocessor 80 reduces the exposure time.

If the exposure time is set at maximum and the output of the linear CCD 72 is still not large enough, gain circuitry can be switched into the signal path. In the present embodiment, gains of 1, 2.71, 7.3 or 20 can be selected in an attempt to optimize the signal supplied to analog-to-digital convertor 88.

In operation, with equal steps of 2.71 each, the exposure is cut from 92 ms to 34 ms (i.e. 92 ms divided by 2.71) each time the gain is increased. As the light is reduced, the exposure builds from 34 ms to 92 ms between each increase in gain. As light is increased from zero, the system will start at a gain of 20 and an exposure of 92 ms and gradually reduce exposure down to 34 ms and then switch gain to 7.3 with exposure of 92 ms, and then gradually reduce the exposure down to 34 ms, at which point gain is switched to 2.71 with exposure at 92 ms. Then gradually the exposure is reduced to 34 ms and a switch in gain is made to one with an exposure of 92 ms and the exposure is then gradually brought down to 6 ms at which point the system is handling the maximum light input. This procedure keeps the exposure high and the gain level low while still using the full range of analog-to-digital converter 88. This gives improved system performance.

Data is collected from linear CCD 72 when light source 68 is turned off and this data is stored in memory 82. This data represents the output of linear CCD 72 due to ambient light and other noise sources. The next set of readings taken from CCD 72 are with light source 68 turned on. Data acquired from CCD 72 with light source 68 turned off is subtracted from data taken from CCD 72 with light source 68 turned on and the difference represents the output of CCD 72 due only to the signal from light source 68.

SEARCH ALGORITHM

Figure 9:
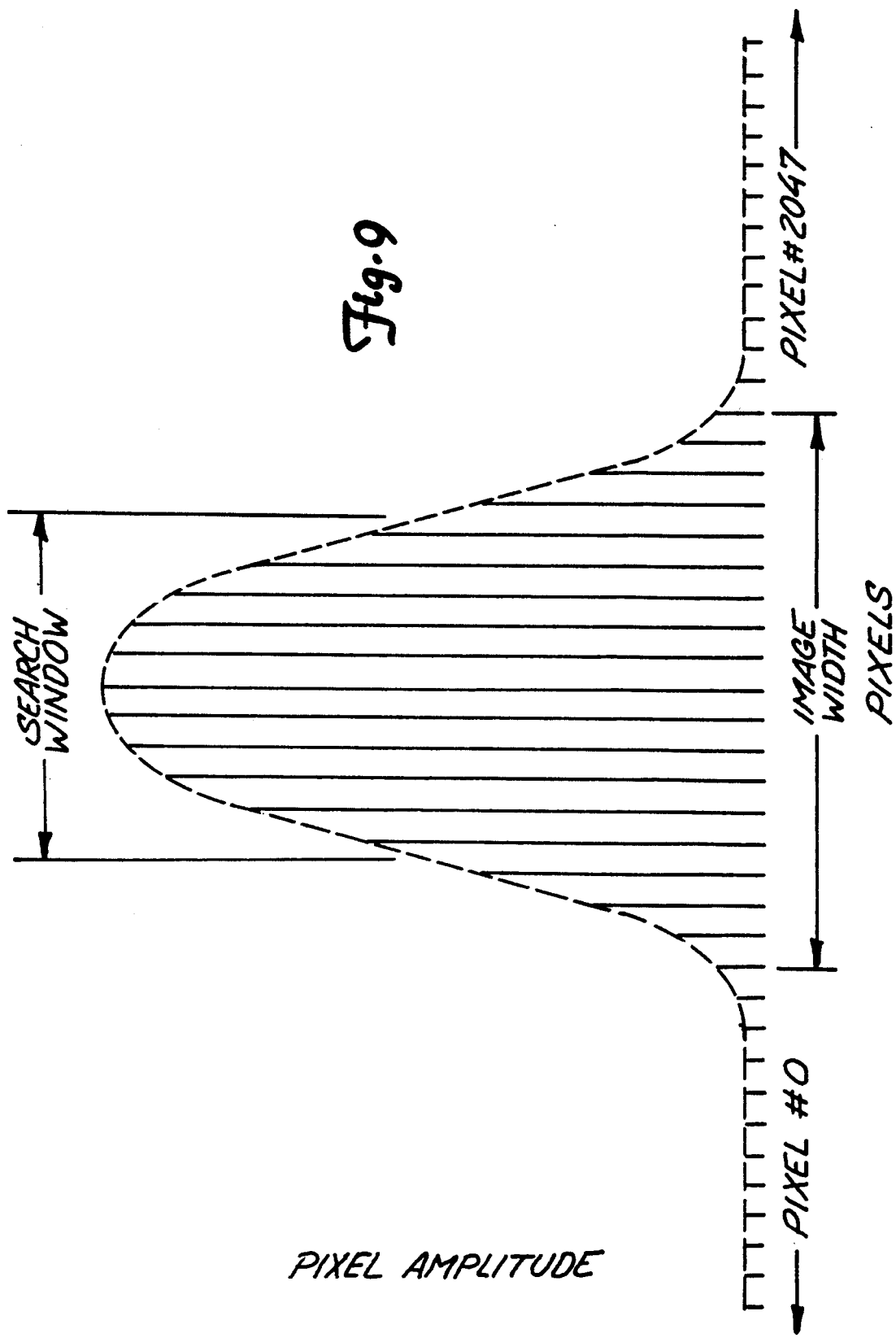
FIG. 9 is a graph of signal strength versus pixel number.

FIG. 9 is a graphical representation of pixel amplitude for a portion of the pixels in the output signal of linear CCD 72. The image seen by linear CCD 72 on optic bench 70 through slit 78 of mask 76 does not have a small enough width to illuminate a single pixel of CCD 72. To receive maximum signal, the width of slit 78 is selected such that at least one pixel behind the center of slit 78 receives light from all parts of the surface of light source 6. This maximizes the intensity of the illumination at the center of the image. Using a standard light emitting diode as light source 68, the width of slit 78 should be equal to about the width of 22 pixels on linear CCD 72. Pixels on each side of the center of the image receive progressively less light from light source 68. This means that the data received from linear CCD 72 does not represent the ideal case in which only a single pixel is illuminated, but has a bell curve distribution as shown in FIG. 9. The width of the search window may be designed to be between about 2 pixel elements and about 40 pixel elements The present invention uses a search algorithm to identify the precise location of the center of the image projected upon linear CCD 72.

The output from linear CCD 72 is generally curved and the pixel levels at the maximum of the output signal are nearly equal. Discriminating between these adjacent pixels would be very susceptible to error and subject to noise interference.

In the present invention, a search algorithm is used which sums ten consecutive pixel values, starting at pixel numbers 0-9 and proceeding through pixel numbers 2038-2047, and locates the ten consecutive pixels in the output of linear CCD 72 which provide the largest sum. The search algorithm is applied to the signal after ambient background signal noise has been subtracted, as described above. A search window having a width of 10 pixels causes the edges of the search window to intersect the output profile of CCD 72 at the points where it has the steepest slope. However, the search window width could range from between about 2 pixels to about 40 pixels in width. This gives the highest signal to noise ratio and the most stability in identifying the center of the image on linear CCD 72 which is illuminated by light source 68. This search algorithm is accurate to plus or minus one pixel. (In the present embodiment, plus or minus one pixel corresponds to about plus or minus 0.012°).

As the search window moves across the output data of linear CCD 72, the sum will begin to increase when the window enters the illuminated area. The sum will reach a maximum when centered over the illuminated area and decrease as the search window moves past the illuminated area. Microprocessor 80 uses the position of maximum sum to determine the measured angle. The search window advances through the output of linear CCD 72 one pixel at a time.

The algorithm first sums the values of pixel number 0 through pixel number 9 in the output array and stores this value in a variable called "HIGH VALUE." HIGH VALUE has a position pointer associated with it which is initialized to zero. HIGH VALUE is loaded into a second variable called "PRESENT VALUE." Next, the value of pixel 0 is subtracted from present value and the value of the next pixel, pixel number 10 is added to PRESENT VALUE. The value of PRESENT VALUE is compared with the value stored in HIGH VALUE. If PRESENT VALUE is greater then HIGH VALUE, than the pointer is updated with the new position, i.e. pixel number 1. If PRESENT VALUE is less than or equal to HIGH VALUE, then the value of the pointer is not updated and the process repeats until the end of the output array from linear CCD 72 is reached by the search window When microprocessor 80 completes the algorithm, the pointer will identify the location of the maximum sum. This value is used in the CCD characterization algorithm (described above) to provide the measurement angle. The measurement angle is displayed on CRT 38 or printer 40.

CONCLUSION

The present invention uses linear CCDs to provide angle measurement in an automotive vehicle wheel alignment system. A microprocessor controls exposure time of the CCD and the on time of a light source. A black level referencing technique is used to increase the accuracy of angle measurements. Each light source/linear CCD pair in the alignment system includes an EEPROM which carries calibration data. A correction algorithm is used to increase accuracy in angle measurements. Noise is limited using exposure control, gain control and an ambient noise substraction technique. The width of the slit is chosen so that at least one pixel of a CCD behind the slit receives light from the entire surface of the light source. A search algorithm is used to more accurately identify the center of an image projected onto the linear CCD.

Although the present invention has been described with reference to preferred embodiments, workers skilled in the art will recognize that changes may be made in form and detail without departing from the spirit and scope of the invention. For example, radiation sources and sensors may operate at wavelengths other than that of visible light.

What is claimed is:

1. A system for measuring an angular relationship of wheels of a vehicle, the system comprising:
   a first head unit for attachment to a first wheel;
   a second head unit for attachment to a second wheel;
   a radiation source mounted on the first head unit for providing an image, the radiation source having a radiation emitting surface;
   a linear CCD mounted on the second head unit having a plurality of linearly spaced pixel elements for receiving the image from the radiation source and providing a CCD output representative of the image;
   means mounted on the second head unit and interposed in a plane between the radiation source and the linear CCD for defining an image of the radiation source upon the CCD;
   a controller connected to the radiation source and the linear CCD for receiving CCD output and providing an output representative of an angle of a wheel of the vehicle; and
   wherein at least one pixel element of the plurality of linearly spaced pixel elements receives radiation from the entire radiation emitting surface of the radiation source.

2. The system of claim 1 wherein the image of the radiation source defined upon the CCD has a width of between 5 and 80 pixel elements.

3. The system of claim 2 wherein the controller includes a search means for locating the image projected on the CCD based upon the CCD outputs.

4. The system of claim 3 wherein the search means includes a search window having a search window width of between 2 and 40 pixel elements.

5. The system of claim 1 wherein the controller includes a noise limiting means for reducing noise in the CCD output from ambient sources.

6. The system of claim 5 wherein the noise limiting means comprises means for activating the radiation source, means for storing the CCD output, and means for subtracting a stored output from the CCD output wherein ambient noise in the CCD output is reduced.

7. The system of claim 1 wherein the second head unit includes a calibration storage element connected to the linear CCD for storing calibration information for the linear CCD.

8. The system of claim 1 wherein the controller includes:
means connected to the radiation source for adjusting an on time of the radiation source;
means connected to the linear CCD for adjusting gain of the CCD output representative of the image; and
means connected to the linear CCD for adjusting an exposure time of the linear CCD.

9. The system of claim 8 and further including means connected to the means for adjusting an on time of the radiation source, means for adjusting gain and the means for adjusting an exposure time for increasing on time and exposure time and reducing gain wherein a maximum output of the output of the linear CCD is adjusted to reach a predetermined maximum output threshold.

10. The system of claim 9 and further including an analog to digital converter connected to the linear CCD wherein a maximum of an analog signal into the analog to digital converter is the predetermined maximum output threshold.

11. The system of claim 1 including a black level reference means for AC coupling the output signal of the CCD and removing a DC bias.

12. The system of claim 1 including an analog-to-digital converter connected to the CCD and the controller for converting the output from the CCD into a digital signal.

13. The system of claim 12 including means for adjusting a signal level of the output of the CCD to maximize the signal level of the output without exceeding a maximum value of the analog-to-digital converter.

14. A system for measuring an angular relationship of wheels of a vehicle, the system comprising:
a first head unit for attachment to a first wheel;
a second head unit for attachment to a second wheel;
a radiation source mounted on the first head unit for providing an image, the radiation source having a radiation emitting surface;
a CCD mounted on the second head unit having a plurality of pixel elements for receiving the image rom the radiation source and providing a CCD output representative of the image;
means mounted on the second head unit and interposed in a plane between the radiation source and the CCD for defining an image of the radiation source upon the CCD;
means for producing an output representative of an angle based upon which pixels are illuminated; and
a controller connected to the radiation source and the CCD for receiving the output representative of an image and providing an output representative of an angle of a wheel of the vehicle.

15. The system of claim 14 wherein the means for defining an image comprises a rectangular slot which has a length and a width, the width shorter than the length.

16. The system of claim 15 wherein the width of the rectangular slot defines a width of the image upon the CCD of between 5 and 80 pixel elements.

17. The system of claim 16 wherein the controller includes a search means for locating the image projected on the CCD based upon the CCD outputs.

18. The system of claim 18 wherein the search means includes a search window having a search window width of between 2 and 40 pixel elements.

19. The system of claim 14 wherein the means for defining an image comprises a lens.

20. The system of claim 19 wherein the controller includes a noise limiting means for reducing background noise in the CCD output from ambient sources.

21. The system of claim 20 wherein the noise limiting means comprises means for activating the radiation source, means for storing the CCD output, and means for subtracting a stored output from the CCD output wherein background noise in the CCD output is reduced.

22. The system of claim 14 wherein the second head unit includes a calibration storage element connected to the CCD for storing calibration information for the CCD.

23. The system of claim 14 wherein the controller includes:
means connected to the radiation source for adjusting an on time of the radiation source;
means connected to the CCD for adjusting gain of the CCD output representative of the image; and
means connected to the CCD for adjusting an exposure time of the CCD.

24. The system of claim 23 and further including means connected to the means for adjusting an on time of the radiation source, means for adjusting gain and the means for adjusting an exposure time for increasing on time and exposure time and reducing gain wherein a maximum output of the output of the CCD is adjusted to reach a predetermined maximum output threshold.

25. The system of claim 24 and further including an analog-to-digital converter connected to the CCD wherein a maximum of an analog signal into the analog to digital converter is the predetermined maximum output threshold.

26. The system of claim 14 including a black level reference means for AC coupling the output signal of the CCD and removing a DC bias.

27. The system of claim 14 including an analog-to-digital converter connected to the CCD and the controller for converting the output from the CCD into a digital signal.

28. The system of claim 27 including means for adjusting a signal level of the output of the CCD to maximize the signal level of the output without exceeding a maximum value of the analog-to-digital converter.

* * * * *

UNITED STATES PATENT AND TRADEMARK OFFICE
CERTIFICATE OF CORRECTION

PATENT NO. : 5,018,853

DATED : May 28, 1991

INVENTOR(S) : Dennis L. Hechel et al.

It is certified that error appears in the above-identified patent and that said Letters Patent is hereby corrected as shown below:

Col. 12, line 13, delete "claim 18, insert --claim 17--.

Signed and Sealed this

Tenth Day of November, 1992

Attest:

DOUGLAS B. COMER

Attesting Officer      Acting Commissioner of Patents and Trademarks